June 16, 1964 R. M. LELIAERT 3,137,101
METHOD AND APPARATUS FOR DEFLASHING PARTS
Filed Dec. 3, 1962 3 Sheets-Sheet 1

INVENTOR.
RAYMOND M. LELIAERT
BY
Bean, Brooks, Buckley+Bean
ATTORNEYS

June 16, 1964  R. M. LELIAERT  3,137,101
METHOD AND APPARATUS FOR DEFLASHING PARTS
Filed Dec. 3, 1962  3 Sheets-Sheet 2
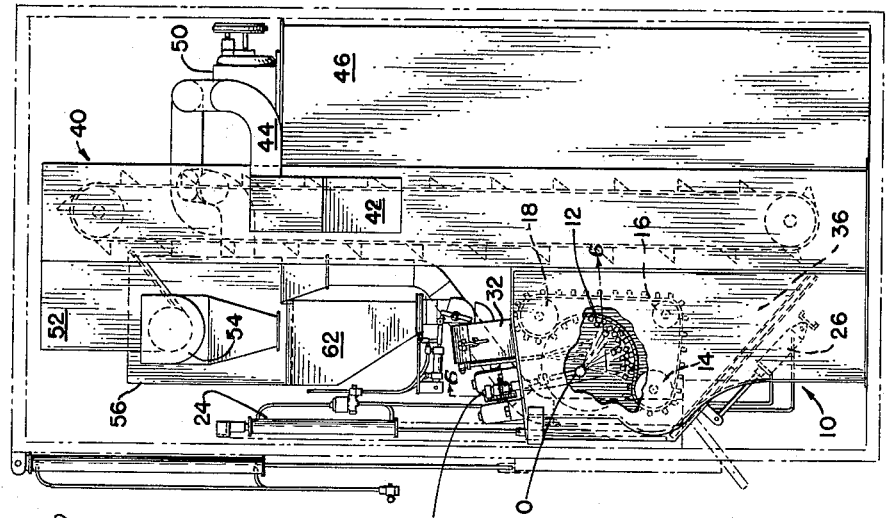
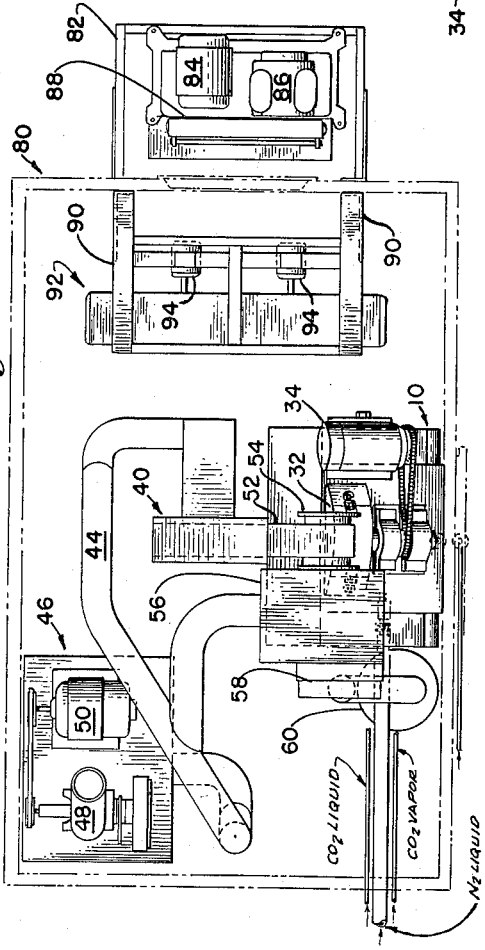
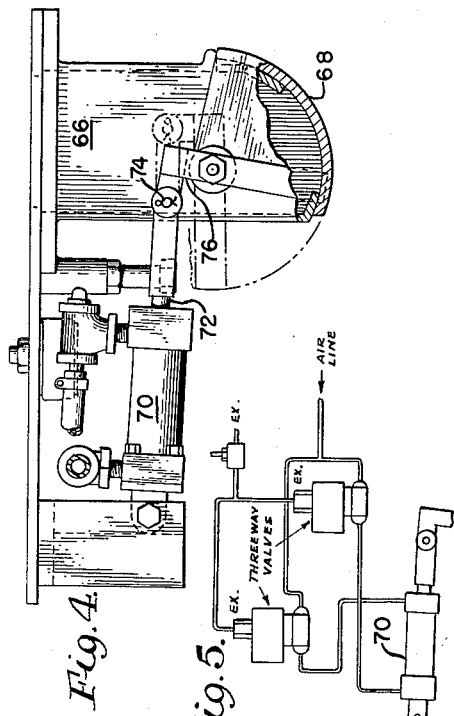
INVENTOR.
RAYMOND M. LELIAERT
BY
Bean, Brooks, Buckley + Bean
ATTORNEYS

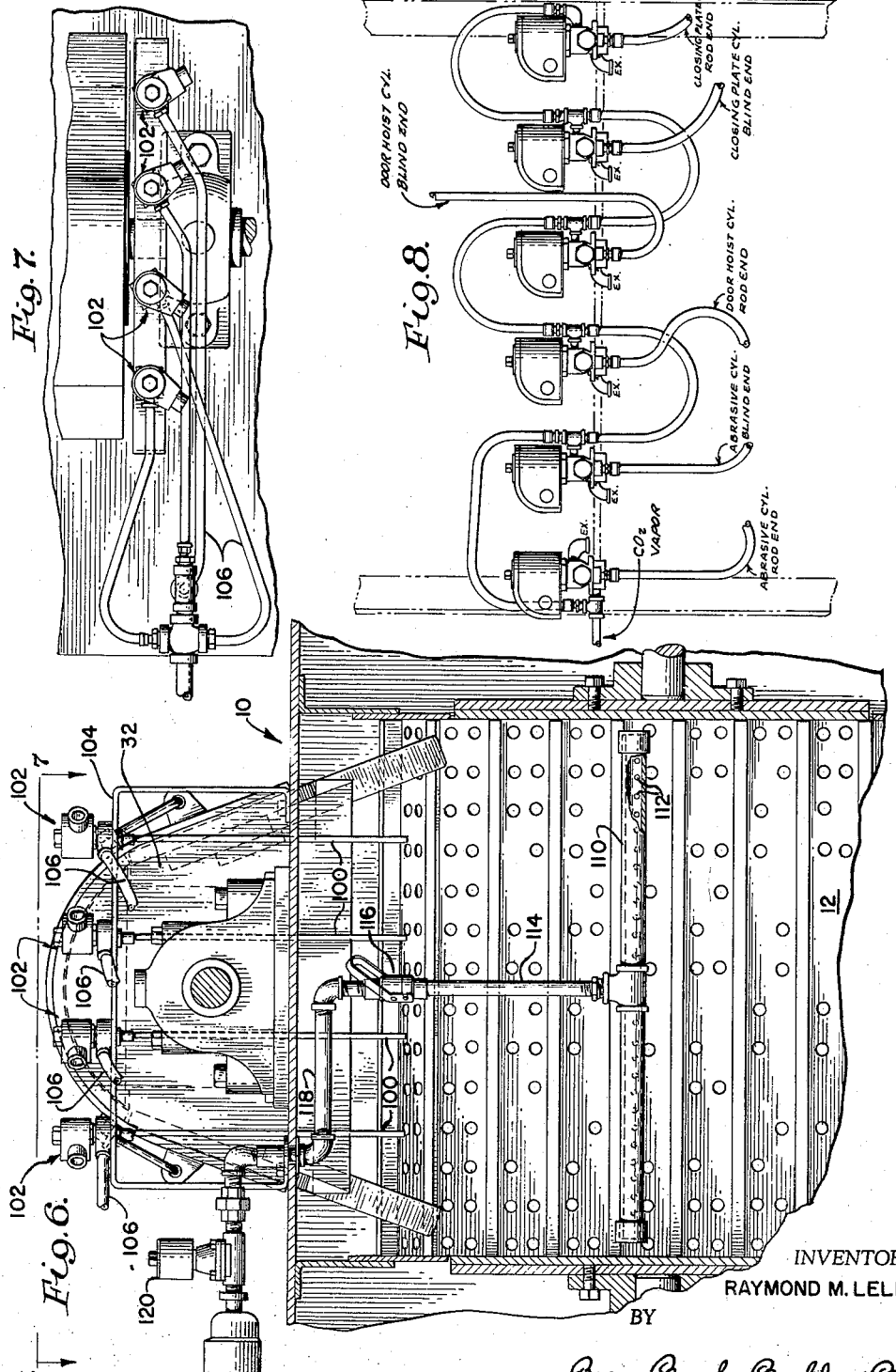

United States Patent Office 3,137,101
Patented June 16, 1964

3,137,101
METHOD AND APPARATUS FOR DEFLASHING PARTS
Raymond M. Leliaert, South Bend, Ind., assignor to Bell Intercontinental Corporation, Mishawaka, Ind.
Filed Dec. 3, 1962, Ser. No. 241,791
17 Claims. (Cl. 51—13)

This invention relates to methods and means for removing flashings, fins or the like or otherwise trimming parts particularly those made from thermoplastic and thermosetting synthetic polymeric materials, hereinafter sometimes referred to as "plastics"; and more particularly to improvements in methods and machines for such purposes using, in general, a technique of "freezing" selected portions of the parts so as to render the flash, fins or like parts brittle and therefore susceptible to removal. This application is a continuation-in-part of my copending application Serial No. 126,617 filed July 25, 1961, now abandoned.

In my prior Patent 2,996,846, method and means for deflashing molded rubber parts is disclosed. The method and means according to this patent are capable of removing fins, flashing and the like from parts provided the fins, flashing or the like is sufficiently embrittled at the operating temperature of the apparatus involved. If a lower operating temperature is required for effecting the removal of the fins, flashing or the like, it has not been considered heretofore practical to do so for the reason that certain problems arise in conjunction with the apparatus used if the temperature is much lower than the operating temperature according to the patent. Generally speaking, these additional problems concern the question of tolerances and embrittlement of the structural members or parts of the apparatus. That is to say, if substantial cooling below that capable with a machine according to my prior patent is utilized, it becomes extremely difficult to manufacture the apparatus so as to have the requisite clearances between operating parts when operating at the resultant abnormally low temperature and, further, this abnormally low temperature will tend to cause embrittlement of the structural members of the apparatus so as to cause its premature failure. Accordingly, it is a primary objective of the present invention to provide an improved apparatus and method for practicing the removal of fins, flashing and the like by the "freezing" technique wherein the parts to be removed, as for example, the fins, flashing or the like, are lowered to the requisite temperature which causes sufficient embrittlement thereof as to permit of their removal while at the same time preventing the structural members and component parts of the apparatus from obtaining a like or substantially like temperature. In other words, the present invention envisages apparatus and means whereby the parts selected for treatment are, at least in part, caused to attain a temperature which is vastly lower than the operating temperature at which the component parts and structure of the machine operates.

Generally speaking, the above objective is obtained by a dual cooling process according to the present invention wherein the parts are first cooled to an intermediate temperature which is at or about the temperature at which the component parts of the machine operate, there being provided novel means and method for effecting a further cooling of the parts so that the portions thereof which are desired to be removed attain a temperature substantially and greatly less than this intermediate temperature without significantly lowering such intermediate temperature at which the apparatus or machine operates.

Specifically, in accordance with the present invention, mechanical refrigeration is preferably used in conjunction with precooling by carbon dioxide to attain the aforesaid intermediate temperature and the final cooling to embrittlement is achieved by the application of liquid nitrogen. Although at least in some instances a multiple cooling process is not essential for achieving or attaining the desired temperature for which certain types of plastics are required to be cooled, the multiple cooling process according to the present invention is a necessity for achieving certain practical aspects as enumerated above. That is to say, it has been found that whereas carbon dioxide materially affects and determines the ambient operating temperature of the apparatus, the use of liquid nitrogen can be so controlled so that the parts, and more especially the portions thereof which is desired to be removed, are lowered materially in their temperature without substantially or significantly affecting the ambient operating temperature of the apparatus under consideration.

According to the present invention, the ambient operating temperature of the apparatus is in the order of $-80°$ F. which represents substantially the lower limit of practicality before the question of tolerances and embrittlement of the structural members of the apparatus becomes an overriding problem. The parts which are introduced into the apparatus are, thereby, more or less uniformly cooled to the aforesaid temperature and, thereafter, a liquid at or well below the embrittlement temperature is used to differentially cool the flash and the main body of the workpiece or part whereafter the application of some flash-removing force, as by applying blasting media in impingement with the parts, is then effective to remove the embrittled flash or like material from the workpieces. These, then, are the essential principles governing the practice of the instant invention and controlling the apparatus utilized in conjunction therewith.

Other objects and advantages of the invention will appear from the description hereinbelow and the accompanying drawing wherein:

FIG. 2 is a top plan view of the assembly as is shown in FIG. 1;

FIG. 3 is a side elevational view of the assembly shown in FIG. 1 with the portion of the casing being broken away to show the disposition of the workpieces during a tumbling and blasting operation;

FIG. 4 is an enlarged elevational view partly broken away showing the mechanism for controlling the introduction of blasting media into the blasting media hurling device;

FIG. 5 is a schematic view showing the mechanism for controlling the actuation of the assembly shown in FIG. 4;

FIG. 6 is an enlarged vertical section taken substantially along the plane of section line 6—6 in FIG. 3 and illustrating the disposition of the mechanism for introducing the cooling media into the machine;

FIG. 7 is a plan view of that portion of the machine as indicated by the line 7—7 in FIG. 6; and FIG. 8 is a somewhat schematic view illustrating a portion of the control mechanism for the assembly.

Figure 1:
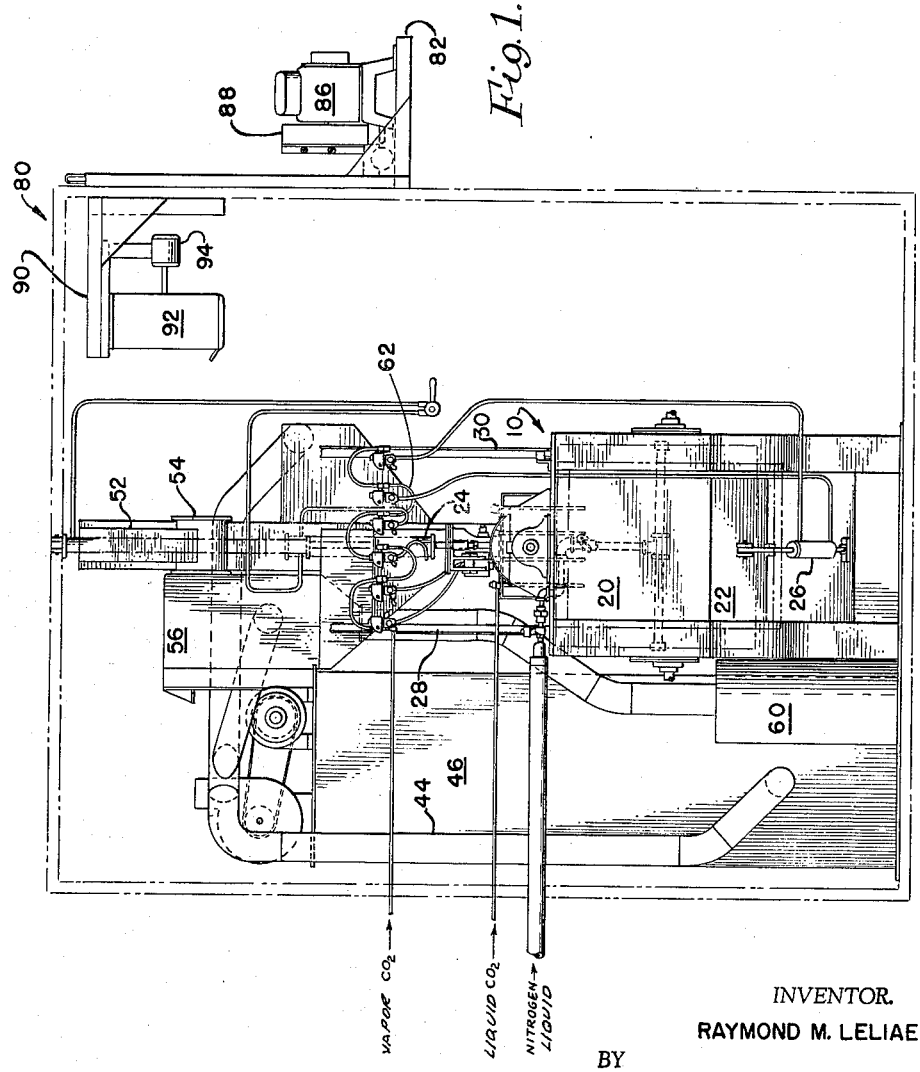
FIG. 1 is a front elevational view of an assembly constructed in accordance with the present invention, including the outer casing, shown in dotted lines in FIG. 1, which materially enhances the mechanical refrigeration aspect of the present invention.

Referring at this time more particularly to FIGS. 1–3 inclusive wherein a preferred form of apparatus for practicing the present invention is illustrated, tumbling and shot blasting apparatus is indicated generally by the reference character 10 and will be seen to include an endless apron type of conveyor 12 which is trained around the spaced pulleys 14 and 16 and around the drive pulley or sprocket assembly 18 and is so arranged that the upper strand of the conveyor device trains under and behind the pair of spaced "barrel heads" (not shown) to cause the endless conveyor to present a pocket type of formation into which the workpieces as shown in FIG. 3 are cradled. A conveyor of this type is disclosed for example in United States Patents 1,567,077, 1,882,443 and 2,104,055. However, it is to be understood that any other suitable type conveyor may be used in lieu thereof.

The front of the cabinet structure which houses the conveyor mechanism 12 is provided with access door means which may be in sectional form as is indicated in FIG. 1, including the upper section 20 and the lower section 22 which are oppositely movable under the action of the respective air cylinder assemblies 24 and 26. Vertical guide rails 28 and 30 are provided for the particular type of upper door section 20 shown in FIG. 1 and the lower door member 22 is adapted to operate at an angle which is indicated more particularly in FIG. 3.

Mounted on the top of the cabinet housing the endless conveyor 12 is a shot blast media hurling assembly 32 and an associated drive mechanism 34 therefor, it being appreciated that this mechanism 32 is of the type for hurling an airless blast of shot media into the confines of the cabinet towards the pocket of the endless conveyor 12 containing the workpieces. This shot blast media hurling or abrasive blast projecting machine may be of any suitable type as for example as is disclosed in United States Patent No. 2,708,814. In any case, the blast machine or its equivalent is arranged, as is set forth above, to direct preferably an airless blast of steel shot or other abrasive materials downwardly into the housing between the barrel heads therein so as to strike against the workpieces which are cradled in the conveyor mechanism.

The workpiece support conveyor 12 is of perforate form to permit passage therethrough of spent abrasive media and small particles or fins or flashings such as have been become detached from the workpieces during operation of the device and, for this purpose, the conveyor device may be formed with drain holes therethrough, or may be otherwise constructed in any preferred manner so as to provide interstices through which the spent abrasive and similar refuse parts from the operation may escape downwardly into a collection hopper portion 36 of the machine. Communicating with the hopper portion 36 of the machine through a rear wall thereof is an elevator assembly indicated generally by the reference character 40. The housing for the elevating means 40 is provided with plenum chamber 42 at one side thereof and a suction conduit 44 is connected to this plenum chamber (FIG. 3) and extends therefrom, to a dust collector housing indicated generally by the reference character 46 (FIG. 2). The interior of the dust collector assembly 46 is connected to the suction side of a fan assembly 48 having an associated drive motor 50 and, as a consequence, fine debris which may become airborne is drawn through the conduit 44 for disposition within the collector 46. Thus, the spent shot blasting media together with larger pieces of debris which do not become airborne within the elevator assembly 40 are dumped by the elevator means into a transfer chamber 52 which leads into a separator assembly 54 which may conveniently take the form of a horizontally disposed open ended foraminous drum provided with any suitable means for rotation thereof and having associated therewith a screw type or other conveyor for directing such material into the hopper-separator assembly 56. Material which does not pass through the rotating screen or foraminous drum of the assembly 54 is discharged through one end thereof to the vertical chute 58 for ultimate disposition into a suitable trash receptacle 60 whereas the spent blasting media which passes through the drum and into the hopper-like lower portion 62 (see FIG. 1) of the assembly 56 collects at the feed control valve assembly for feeding the blast projecting machine 32.

Such control valve assembly is illustrated best in FIG. 4 wherein the reference character 66 indicates the feed chute for delivering the spent blast media through the machine 32 which chute will be seen to have its arcuated lower end closed by the plate assembly 68. The valve or closure plate 68 is operated under control of a double acting cylinder 70 whose piston rod 72 is connected through the pivot 74 to an arm 76 rigid with the closure plate 68.

The entire assemblage is housed within an outer casing indicated generally by the reference character 80 and it is preferred that this outer housing or casing possesses good insulation qualities to render the mechanism as efficient as possible. The housing 80 may mount a platform assembly 82 upon which is mounted a motor 84 and associated compressor 86 driven thereby, an associated condenser assembly being indicated by reference character 88. Interiorly of the casing or housing 80 is mounted suitable support means 90 mounting the evaporator assembly 92 and associated fan motors 94 for circulating the air inside the housing 80 through the evaporator coils and so to mechanically refrigerate the interior of such casing 80.

It is to be understood that the assemblages thus far described may take any convenient or conventional form as desired, the principles of the present invention not being restricted to any specific construction thereof.

Referring at this time more particularly to FIG. 6, it will be seen that the interior of the machine housing 10 is provided with two sets of cooling medium distributing means, the first of these is preferably in the form of a plurality of tubes 100 which project downwardly into the interior of the housing 10 and which are connected to the discharge sides of a plurality of individual valve assemblies 102 mounted exteriorly of the housing 10 on a suitable bracket means 104 therefor. Liquid carbon dioxide is distributed to the several valves 102 by means of the conduits 106 and it will be appreciated that these individual valves 102 are provided with suitable control means (not shown) by means of which the valves can be individually or collectively controlled for distributing liquid carbon dioxide to the tubes or nozzles 100 to precool the interior of the casing or housing 10. The second of the cooling medium distributing means takes the form of a transverse manifold 110 which is in the form of a tube or pipe horizontally disposed and enclosed at its opposite ends, being provided along its length with a series of spaced openings or discharge ports 112, the disposition of the manifold 110 and the openings therein being such as to distribute liquid nitrogen in a fine mist or spray to the workpieces held by the conveyor means 12, see particularly FIG. 3. A mounting nipple 114 tees into the manifold 110 and is preferably provided with a quick disconnect coupling assembly 116 for connection at its upper end to the liquid nitrogen supply conduit 118 which extends to an external source of liquid nitrogen and which conduit includes a control valve 120 similar to the previously mentioned control valves 102.

It will be appreciated that the liquid carbon dioxide cools to about −109° F. and, the combination of the mechanical refrigeration for the cabinet or housing 80 together with the cooling action of the carbon dioxide will achieve an intermediate temperature at which the assembly 10 is in the neighborhood of about −80° F. The effect of the liquid carbon dioxide, when introduced into the assembly 10, is to immediately vaporize and to thus surround and envelop any workpieces located within the machinery and the carbon dioxide vapor will effect substantially the same degree of cooling to the workpieces as it does to the structural components of the machine 10 so that, as aforesaid, the steady state temperature of the machinery 10 as occasioned by the contribution of the combination of the mechanical refrigeration and the cooling effected by the carbon dioxide vapor affects the aforementioned intermediate temperature. As has been set forth, it is not desirable to cool component parts of the machine 10 much below the stated intermediate temperature since it becomes difficult to control tolerances much below that temperature and, further, the structural and component parts of the machine are adversely affected toward embrittlement, and the assembly is thus structurally weakened, if the ambient or steady state temperature at which the machine operates is much below this figure. Consequently, it is an important aspect of the present invention to effect the final cooling of the workpieces in such fashion as does not materially affect the stated ambient or steady state intermediate temperature at which the machinery 10 operates. This is effected, as has been set forth hereinabove, by the introduction of a cooling liquid, in the specific instance described, liquid nitrogen, and, furthermore, the cooling liquid is so introduced as to be substantially evenly or uniformly distributed upon the exposed surface portions of the workpieces to the exclusion of any surface portion of the machinery 10. In this way, the cooling liquid is applied substantially only to the workpieces and whereas they will therefore become cooled to such a point at which the flash or the like is embrittled, the ambient or steady state temperature of the machinery is, as aforesaid, not substantially or materially affected thereby.

The term "freezing" or "embrittlement" as utilized herein, and especially reference thereto as regards temperature, is intended to mean that state or condition of the flash or the like wherein the same has been embrittled to such an extent that the impacting forces applied thereto, as for example by the airless blast media, are effective to remove such flash or the like. The intermediate temperature, as above, is insufficient to cause embrittlement of the flash within the meaning as described thereto hereinabove.

It will be noted that the cooling effect of the carbon dioxide vapor is vastly different from the cooling effect as achieved by the cooling liquid which is later introduced. The carbon dioxide vapor is, so to speak, of a pervasive nature so that it cools not only the workpieces or parts but also the means which confines and supports these parts. The cooling liquid, on the other hand, is applied directly to and substantially only to the parts or workpieces and thus imparts a cooling effect predominantly and substantially only on these workpieces to, in effect, permit the confining and supporting means for the workpieces to operate at a temperature which is substantially higher than the temperature to which the flash is reduced to cause the embrittlement or frozen condition thereof. To more clearly illustrate the principles of the present invention, a typical cycle might employ the following steps:

(1) Conveyor mill turning over the parts to be deflashed.

(2) Liquid carbon dioxide at 300 p.s.i. is sprayed on the surface of the parts and in expanding to vapor or gas provides the initial cooling to the intermediate temperature. The application of this carbon dioxide may vary from as little as 4 to as much as in excess of 180 seconds depending, of course, upon the hardening temperature of the parts, the size and shape of the parts as well as the quantity or total mass or weight of the parts involved.

(3) On completion of step 2 above, liquid nitrogen is sprayed in a mist form upon the parts of a duration of from about 10 seconds to in excess of 180 seconds, depending on the flow rate of liquid nitrogen, the nature of the material from which the parts are molded, the shape, size and quantity of the parts.

(4) Upon completion of step 3, the blasting media is hurled at the parts to remove the hardened or frozen flash by impact while not causing any damage, etching or the like to the unfrozen body of the parts.

(5) Timed shots of liquid nitrogen are sprayed on the surface of the parts as they are tumbled and during the flash removing cycle for the reason that since all of the parts cannot be deflashed simultaneously, it will be a continual tendency towards thawing or warming requiring these additional applications or shots of liquid nitrogen.

(6) Upon completion of the deflashing cycle, the blasting media is cut off, the liquid nitrogen is turned off, and the parts are permitted to continue turning over from a time from 5 to 50 seconds to separate the media from the trimmed and deflashed parts.

It is to be understood that certain changes and modifications as illustrated and described may be made without departing from the spirit of the invention or the scope of the following claims.

I claim:

1. The method of removing flash and the like from workpieces which comprises,
    confining and cooling workpieces and the confining means therefor to an intermediate temperature above that required to cause embrittlement of the flash,
    applying a film of liquid to the surfaces of the workpieces in which the liquid is at a temperature lower than said intermediate temperature by an amount sufficient to cause embrittlement of the flash,
    controlling the amount of liquid so applied such that the confining means is maintained substantially at the stated intermediate temperature while the flash is embrittled but exclusive of any substantial degree of embrittlement of the main bodies of the workpieces,
    and then subjecting said workpieces to impact forces sufficient to remove the embrittled flash.

2. Apparatus for the removal of flash and the like from workpieces, comprising
    a housing for confining workpieces,
    means for cooling said housing and the contents thereof to an intermediate temperature,
    means for applying a film of liquid colder than said intermediate temperature directly to workpieces within said housing,
    and means for subjecting workpieces within said housing to impact forces.

3. A method of removing flash and the like from workpieces which comprises,
    confining the workpieces and cooling them to an intermediate temperature insufficient to cause embrittlement of the flash,
    further cooling the workpieces, while maintaining the confining means therefor substantially at said intermediate temperature, to a temperature sufficient to cause embrittlement of the flash,
    and then subjecting the workpieces to impact forces to remove the embrittled flash.

4. The method according to claim 3 wherein the first mentioned cooling consists of mechanically refrigerating the workpieces and applying carbon dioxide vapor thereto, said further cooling consisting of applying a mist of liquid nitrogen directly upon the workpieces.

5. The method according to claim 3 wherein said further cooling consists of applying a mist of liquid nitrogen directly upon the workpieces.

6. The method according to claim 5 wherein the last step consists of subjecting the workpieces to an airless barrage of projectiles.

7. Apparatus for the removal of flash and the like from workpieces, comprising, in combination,
    a housing having a pocket-defining conveyor therein,
    means for discharging carbon dioxide vapor within said housing to cool the same and any contents thereof,
    means for discharging a curtain of liquid nitrogen having a discharge area confined to the pocket-defining portion of said conveyor to impinge upon workpieces supported therein,
    and means for moving said conveyor to effect a maximum of surface exposure of any workpieces supported as aforesaid.

8. Apparatus as defined in claim 7 wherein said housing is enclosed within a cabinet,
    and means for mechanically refrigerating the interior of said cabinet.

9. Apparatus according to claim 8 including means mounted on said housing for directing an airless barrage of projectiles toward the pocket-defining portion of said conveyor.

10. Apparatus according to claim 7 including means mounted on said housing for directing an airless barrage of projectiles toward the pocket-defining portion of said conveyor.

11. Apparatus according to claim 2 wherein said housing is enclosed within a cabinet,
and means for mechanically refrigerating the interior of said cabinet.

12. Apparatus according to claim 11 including means mounted on said housing for directing an airless barrage of projectiles into said housing.

13. Apparatus for the removal of flash and the like from workpieces such as molded articles, comprising in combination,
a housing for confining workpieces,
means for discharging a pervasive cooling media into the interior of said housing to cool said housing and any workpieces therein to an intermediate temperature insufficient to cause embrittlement of flash thereon,
means for discharging a liquid colder than said intermediate temperature substantially only upon workpieces within said housing,
means controlling the last-mentioned means to prevent any substantial degree of cooling of said housing by the liquid,
and means for impacting workpieces within said housing to remove flash therefrom frozen by said liquid.

14. Apparatus according to claim 13 wherein said housing is enclosed within a cabinet,
and means for mechanically refrigerating the interior of said cabinet.

15. Apparatus according to claim 13 wherein the last-mentioned means comprises mechanism for discharging an airless barrage of projectiles into said housing.

16. Apparatus according to claim 15 including means for collecting refuse comprising debris and spent projectiles from said housing,
means for separating reusable projectiles from said refuse and returning the same to said mechanism.

17. Apparatus according to claim 16 wherein said housing, said means for collecting refuse and said means for separating and returning reusable projectiles are enclosed within a cabinet,
and means for mechanically refrigerating the interior of said cabinet.

References Cited in the file of this patent

UNITED STATES PATENTS

| | | |
|---|---|---|
| 2,476,540 | Fraser | July 19, 1949 |
| 2,533,653 | Winkeljohn | Dec. 12, 1950 |
| 2,682,732 | Hanrahan et al. | July 6, 1954 |
| 2,881,571 | Granata | Apr. 14, 1959 |
| 2,996,846 | Leliaert | Aug. 22, 1961 |